(12) United States Patent
Jefford et al.

(10) Patent No.: US 10,030,780 B2
(45) Date of Patent: Jul. 24, 2018

(54) INTEGRATED VALVE ASSEMBLY

(71) Applicant: Continental Automotive Systems, Inc., Auburn Hills, MI (US)

(72) Inventors: Robert Douglas Jefford, Chatham (CA); Benjamin Dominick Manton Williams, Chatham (CA); Adrian Ovidiu Crisan, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 175 days.

(21) Appl. No.: 14/265,646

(22) Filed: Apr. 30, 2014

(65) Prior Publication Data

US 2014/0326337 A1 Nov. 6, 2014

Related U.S. Application Data

(60) Provisional application No. 61/818,088, filed on May 1, 2013.

(51) Int. Cl.
*F02M 33/02* (2006.01)
*F16K 15/18* (2006.01)
(Continued)

(52) U.S. Cl.
CPC ............ *F16K 15/186* (2013.01); *F02B 37/16* (2013.01); *F02B 37/164* (2013.01);
(Continued)

(58) Field of Classification Search
CPC ............. F02M 19/086; F02M 25/0729; F02M 35/1227; F02M 35/10255;
(Continued)

(56) References Cited

U.S. PATENT DOCUMENTS

| 4,612,771 A | 9/1986 | Ando |
| 2003/0089345 A1* | 5/2003 | Itou ................... F02M 25/0836 |
| | | 123/520 |

(Continued)

FOREIGN PATENT DOCUMENTS

| DE | 102011078993 A1 | 1/2012 |
| JP | S54137514 A | 10/1979 |

(Continued)

OTHER PUBLICATIONS

PCT/US2014/036336, The International Search Report and the Written Opinion of the International Searching Authority dated Aug. 25, 2014.

*Primary Examiner* — Lindsay Low
*Assistant Examiner* — Omar Morales

(57) ABSTRACT

A valve assembly for an air flow system, where the air flow system has a turbocharger unit and a venturi valve member for receiving a portion of the pressurized air from the turbocharger unit, and generating back pressure. The valve assembly includes a bypass switching valve and a bypass check valve. During a first mode of operation, the valve assembly is exposed to vacuum pressure, and the bypass check valve is exposed to the vacuum pressure such that the bypass check valve is placed in a closed position. During a second mode of operation the turbocharger unit is activated, pressurized air flows through the bypass switching valve, and places the bypass check valve in an open position, and the back pressure generated by the venturi valve member and the pressurized air from the turbocharger unit creates a pressure differential in the bypass check valve.

21 Claims, 3 Drawing Sheets

(51) Int. Cl.
   *F02B 37/16* (2006.01)
   *F02M 19/08* (2006.01)
   *F02M 25/08* (2006.01)
(52) U.S. Cl.
   CPC ........ *F02M 19/086* (2013.01); *F02M 25/089* (2013.01); *F02M 25/0836* (2013.01); F02M 2025/0845 (2013.01); Y02T 10/144 (2013.01); *Y10T 137/7761* (2015.04); *Y10T 137/7768* (2015.04)
(58) Field of Classification Search
   CPC ......... F02M 35/10275; F02M 25/0836; F02M 2025/0845; F01L 1/44; F01L 5/00; F01L 5/08; F01L 7/06; F16K 15/186
   USPC ......... 123/520, 516, 539, 556, 90.4, 184.54, 123/188.14, 190.4, 518
   See application file for complete search history.

(56) References Cited

U.S. PATENT DOCUMENTS

| | | | |
|---|---|---|---|
| 2004/0011409 A1* | 1/2004 | Martus | F02M 25/0836 137/557 |
| 2012/0237368 A1 | 9/2012 | Pursifull | |
| 2012/0318243 A1* | 12/2012 | Williams | F02M 25/0836 123/520 |
| 2012/0318244 A1 | 12/2012 | Williams | |
| 2013/0008413 A1 | 1/2013 | Inoguchi | |
| 2013/0152904 A1* | 6/2013 | Balsdon | F02M 25/0836 123/518 |

FOREIGN PATENT DOCUMENTS

| | | |
|---|---|---|
| WO | 2012174347 A1 | 12/2012 |
| WO | 2013011366 A2 | 1/2013 |

\* cited by examiner

INTEGRATED VALVE ASSEMBLY

CROSS-REFERENCE TO RELATED APPLICATIONS

This application claims the benefit of U.S. Provisional Application No. 61/818,088 filed May 1, 2013. The disclosure of the above application is incorporated herein by reference.

FIELD OF THE INVENTION

The invention relates generally to an integrated valve assembly having multiple modes of operation, allowing or preventing airflow through the valve assembly.

BACKGROUND OF THE INVENTION

Current purge systems for engines having a turbocharger unit use a venturi vacuum generator (i.e., a vacuum pump) to allow purge of the evaporative system while the turbocharger unit is activated (manifold under positive pressure). To create this vacuum pump, significant amounts of the air flow from the turbocharger unit are used, thereby reducing the power increase to the engine created by the turbocharger unit. One attempt to limit the amount of pressurized air running through the vacuum pump, and temporarily maximize power, is to include a turbo bypass switching valve (BSV) to alter the amount of pressurized air going to the vacuum pump. The BSV is opened and closed to control how much air is diverted from the turbocharger unit when the turbocharger unit is activated. There is a mass airflow sensor downstream of the turbocharger unit which monitors the airflow during naturally aspirated conditions, and conditions when the turbocharger unit is activated and generating pressurized air.

Because the mass airflow sensor is located in a separate flow path from the vacuum pump, the vacuum pump in effect creates a secondary flow path from the airbox to the manifold, circumventing the mass airflow sensor, and has the potential to allow unmonitored air into the engine during naturally aspirated conditions. In order to block this secondary flow path, turbo purge systems have been developed with an additional check valve between the BSV and the turbo outlet, which allows flow in conditions when the turbocharger unit is generating pressurized air to drive the venturi vacuum generator, but blocks flow under naturally aspirated (vacuum) conditions.

However, incorporating the additional valve into this secondary flow path has been met with increased difficulty and expense due to packaging restrictions within the vehicle, and the need to prevent the valve from improperly altering air flow. Accordingly, there exists a need for a valve assembly which allows air to pass to the venturi vacuum generator when the turbocharger unit is activated, and closes under naturally aspirated (vacuum) conditions, without altering air flow.

SUMMARY OF THE INVENTION

The present invention is an integrated valve assembly which has a check valve integrated into the valve assembly along with a bypass switching valve. The check valve allows air pressurized by a turbocharger to enter the valve assembly, but the check valve is drawn closed by manifold vacuum under naturally aspirated engine conditions.

In one embodiment, the present invention is a valve assembly for an air flow system, where the air flow system has a turbocharger unit for selectively generating pressurized air when activated, and directing at least a portion of the pressurized air to an intake manifold. The air flow system also includes a venturi valve member for receiving a portion of the pressurized air from the turbocharger unit, and generating back pressure. The valve assembly includes a bypass switching valve in fluid communication with the turbocharger unit, and a bypass check valve in fluid communication with the bypass switching valve, and the venturi valve member.

During a first mode of operation, the turbocharger unit is deactivated, and the valve assembly is exposed to vacuum pressure from the intake manifold such that when the bypass switching valve is open, the bypass check valve is exposed to the vacuum pressure such that the bypass check valve is placed in a closed position. During a second mode of operation the turbocharger unit is activated, and when the bypass switching valve is open, pressurized air flows through the bypass switching valve, and places the bypass check valve in an open position, and the back pressure generated by the venturi valve member and the pressurized air from the turbocharger unit creates a pressure differential in the bypass check valve.

The valve assembly also includes an overmold assembly, a solenoid assembly disposed in the overmold assembly, an overmold assembly cavity formed as part of the overmold assembly, a cap connected to the overmold assembly, a reservoir connected to the cap, and a reservoir cavity formed as part of the reservoir. A lower wall forms part of the reservoir cavity, and is part of the reservoir, and at least one check valve aperture is formed as part of the lower wall such that the check valve aperture provides fluid communication between the reservoir cavity and the bypass check valve. A cap aperture is formed as part of the cap and provides fluid communication between the overmold assembly cavity and the reservoir cavity.

The solenoid assembly opens and closes the bypass switching valve, and during the first mode of operation and when the bypass switching valve is open, the overmold assembly cavity is exposed to the vacuum pressure, and therefore the cap aperture, the reservoir cavity, and the at least one check valve aperture are also exposed to the vacuum pressure, closing the bypass check valve. During the second mode of operation, the pressurized air flows through the overmold assembly cavity, the cap aperture, and into the reservoir cavity, and through the at least one check valve aperture, applying pressure to the bypass check valve, opening the bypass check valve.

The bypass check valve includes several components, such as a check valve cavity, a valve member disposed in the check valve cavity, and a flexible flange portion formed as part of the valve member. An outer edge is formed as part of the flexible flange portion such that the outer edge is selectively in contact with the bottom surface of the lower wall. An enclosed area is formed between the inside surface of the flexible flange portion and the lower wall when the outer edge of the flexible flange portion is in contact with the lower wall. During the second mode of operation, the pressurized air flows through the at least one check valve aperture and into the enclosed area until enough pressure is applied to the flexible flange portion to move the outer edge way from the lower wall.

The bypass check valve also includes a base member disposed in a central aperture formed as part of the lower wall, a support member connected to the base member, and a retention feature is connected to the base member. The flexible flange portion is exposed to at least a portion of the pressurized air from the turbocharger unit and the back pressure created by the venturi valve assembly, creating the pressure differential around the flexible flange portion, such that the magnitude of movement of the flexible flange portion away from the lower wall is in proportion to the pressure differential.

In alternate embodiments, various check valve designs could be integrated into the valve assembly, such as a flap valve, a duckbill valve, or the like, and all would be suitable. The check valve could also be incorporated into the inlet of the valve assembly, and the valve assembly would still perform as desired.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
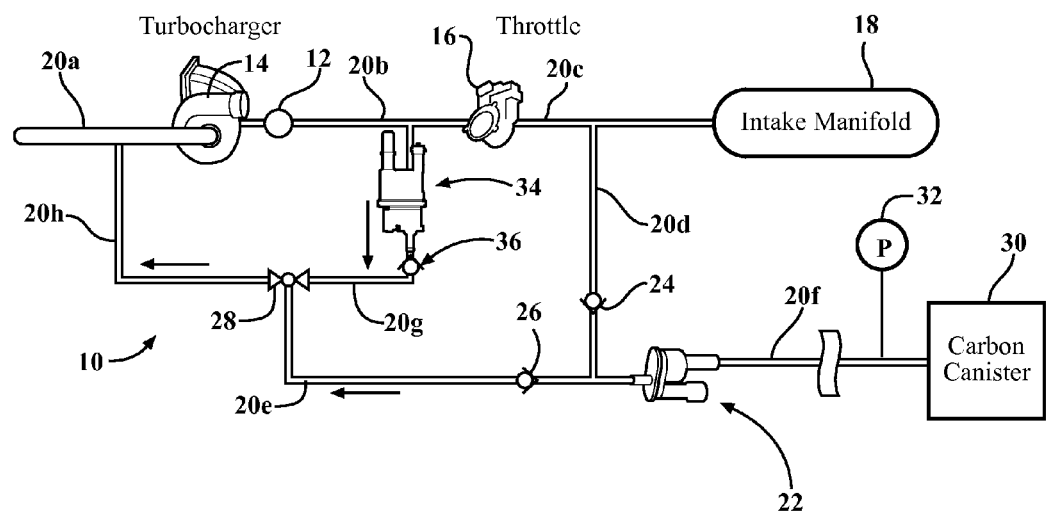
FIG. 1 is diagram of an air flow system having an integrated valve assembly in a first mode of operation, according to embodiments of the present invention.

The following description of the preferred embodiment(s) is merely exemplary in nature and is in no way intended to limit the invention, its application, or uses.

A diagram of a turbocharger system having an integrated valve assembly according to the present invention is shown in the Figures generally at 10. The system 10 includes a plurality of conduits. One of the conduits is an intake passage 20a which intakes air from the atmosphere. Located downstream of and in fluid communication with the intake passage 20a is a turbocharger unit 14, and located downstream of and in fluid communication with the turbocharger unit 14 is a mass air flow sensor (MAF) 12, and located downstream of and in fluid communication with the MAF 12 is a throttle assembly 16. The throttle assembly 16 controls the amount of air flow into an intake manifold 18, which is part of an engine. Air flows from the throttle assembly 18 into the intake manifold 20.

As mentioned above, a plurality of conduits also provides fluid communication between the various components. Air flows through the conduits between the various components, and the direction of airflow through the conduits varies, depending on the mode of operation of each component. More specifically, in addition to the intake passage 20a providing fluid communication from the atmosphere to the turbocharger 14, there is a second conduit 20b providing fluid communication between the turbocharger 14 and the throttle assembly 16, and the MAF 12 is disposed in the second conduit 20b. There is also a third conduit 20c providing fluid communication between the throttle assembly 16 and the intake manifold 18.

A fourth conduit 20d is in fluid communication with the third conduit 20c and a fifth conduit 20e. The fifth conduit 20e also places a turbo purge valve assembly, shown generally at 22, in fluid communication with a venturi valve assembly 28. A first check valve 24 is located in the fourth conduit 20d, and a second check valve 26 is located in the fifth conduit 20e. There is also a carbon canister 30 in fluid communication with the turbo purge valve assembly 22 through the use of a sixth conduit 20f, and a pressure sensor 32 connected to the sixth conduit 20f to detect the pressure in the sixth conduit 20f.

A seventh conduit 20g provides fluid communication between the venturi valve assembly 28 and the second conduit 20b, such that pressurized air is able to flow from the second conduit 20b, through the seventh conduit 20g and to the venturi valve assembly 28. An eighth conduit 20h provides fluid communication between the venturi valve assembly 28 and the intake passage 20a.

Figure 2:
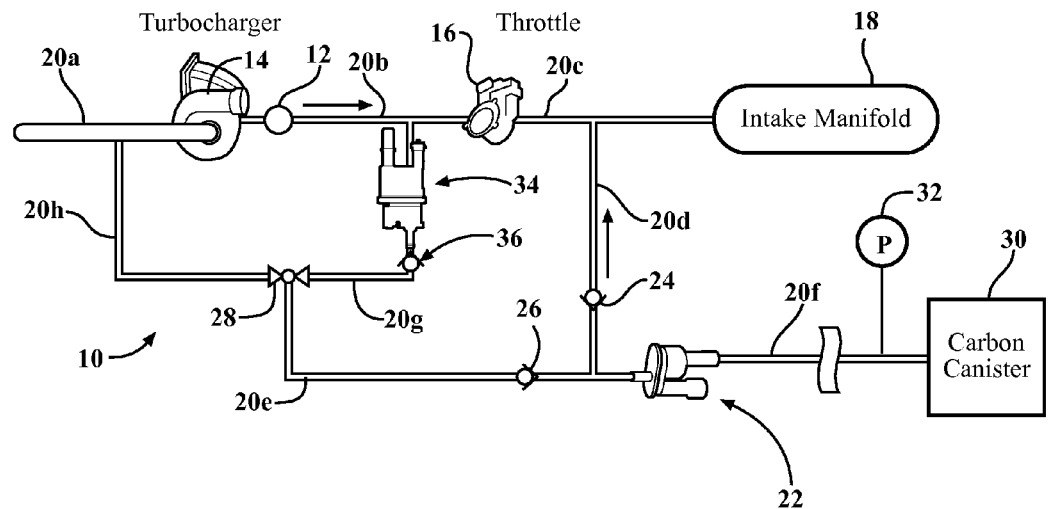
FIG. 2 is diagram of an air flow system having an integrated valve assembly in a second mode of operation, according to embodiments of the present invention.
Figure 3:
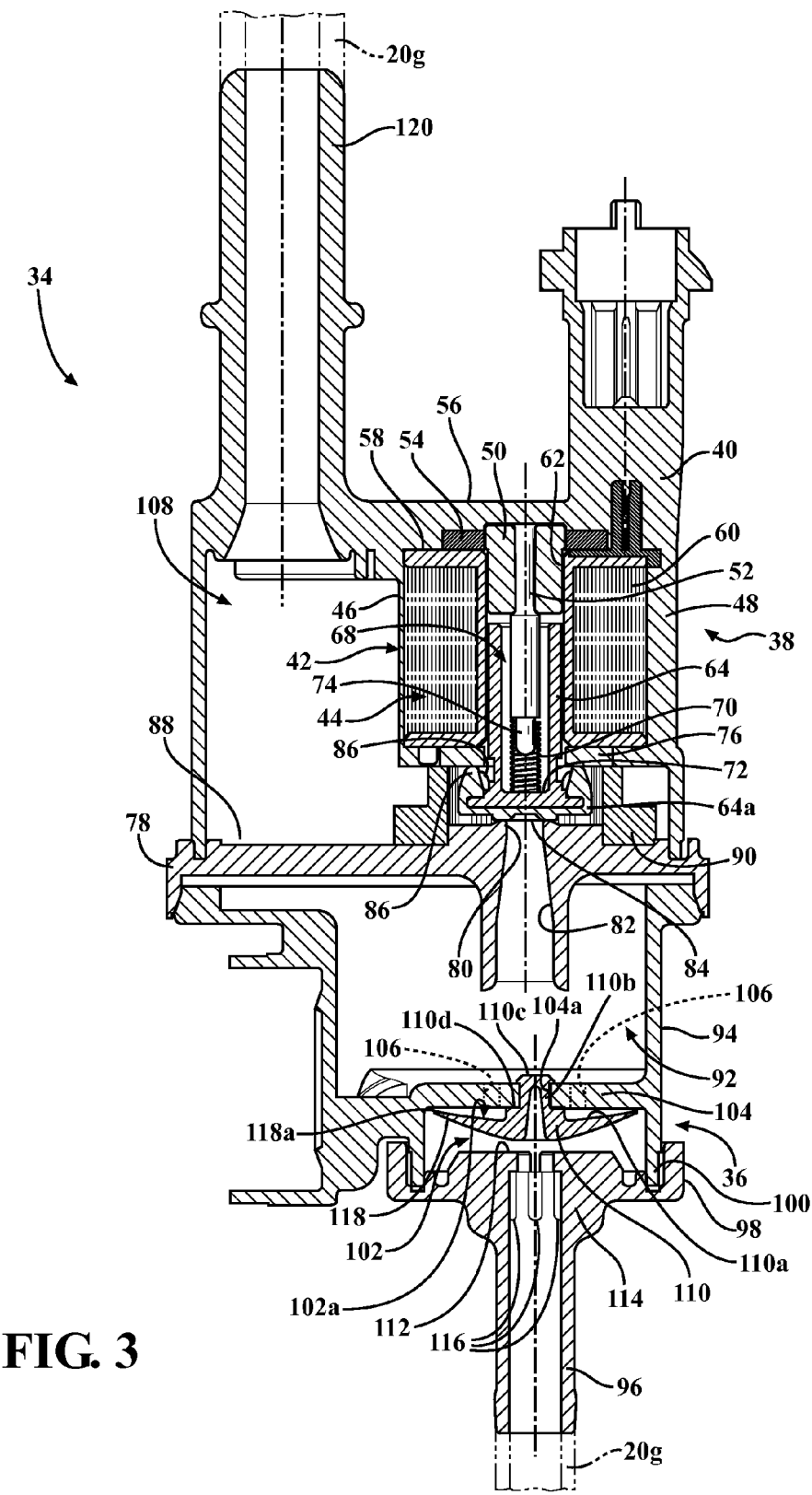
FIG. 3 is a sectional side view of an embodiment of an integrated valve assembly, according to embodiments of the present invention.

With reference to FIGS. 1-3, disposed in the seventh conduit 20g is a bypass switching valve assembly, shown generally at 34, having a third check valve, or bypass check valve, shown generally at 36, and a bypass switching valve, shown generally at 38. The check valve 36 is also in fluid communication with the venturi valve assembly 28.

The bypass switching valve assembly 34 includes an overmold assembly 40, and disposed within the overmold assembly 40 is a solenoid assembly, shown generally at 42, which is part of the bypass switching valve 38. The solenoid assembly 42 is disposed within a cavity, shown generally at 44, formed as part of the overmold assembly 40, and the cavity 44 includes an inner wall portion 46, and also forming part of the cavity 44 is an outer wall portion 48 of the overmold assembly 40.

The solenoid assembly 42 includes a stator insert 50 which surrounds a support 52 formed as part of the overmold assembly 40. A first washer 54 is disposed between an upper wall 56 of the overmold assembly 40 and a bobbin 58. The bobbin 58 is surrounded by a coil 60, and two straps (not shown) surround the coil 60. There is a sleeve 62 which is surrounded by the bobbin 58, and the sleeve 62 partially surrounds a moveable armature 64. The armature 64 includes a cavity, shown generally at 68, and located in the cavity 68 is a spring 70, which is in contact with an inner surface 72 of the cavity 68. The spring 70 is also mounted on a narrow diameter portion 74 of the support 52. Disposed between part of the armature 64 and the bobbin 58 is a second washer 76. Connected to the overmold assembly 40 is a cap 78, and formed as part of the cap 78 is a valve seat 80 and a cap aperture 82, where purge vapor is able to flow from an overmold assembly cavity, shown generally at 108, formed as part of the overmold assembly 40 and through the cap aperture 82.

The armature 64 includes a stopper portion 64a which is made of a rubber or other flexible material. The stopper portion 64a includes a contact surface 84 which contacts the valve seat 80 when the armature 64 is in the closed position. The stopper portion 64a includes a plurality of post members 86 which are of the same durometer, but are of different sizes, and therefore have different levels of stiffness. The largest post members 86 are in contact with the bottom surface of the washer 76 when the armature 64 is in the closed position, as shown in FIG. 3. The smaller post members 86 contact the bottom surface of the washer 76 when the armature 64 moves to the open position. The more the coil 60 is energized, the further the armature 64 moves away from the valve seat 80, and the greater number of post members 86 contact the bottom surface of the washer 76. Because the post members 86 are made of rubber, the post members 86 are able to deform as the armature 64 is moved further away from the valve seat 80. The largest post members 86 in contact with the bottom surface of the washer 76 deform first when the armature 64 moves away from the valve seat 80. As the armature 64 moves further away from the valve seat 80, more of the post members 86 contact the bottom surface of the washer 76, and then begin to deform as the armature 64 moves even further away from the valve seat 80. The deformation of the post members 86 (when the armature 64 is moved to the open position away from the valve seat 80) functions to dampen the movement of the armature 64, eliminating noise, and preventing metal-to-metal contact between the armature 64 and the stator insert 50.

Disposed between the bottom surface of the washer 76 and an inside surface 88 of the cap 78 is a filter 90. The filter 90 is made of several blades of plastic which are adjacent one another. The filter 90 is designed to limit the size of debris and particles passing through the blades of plastic to less than 0.7 millimeters. The distance between the armature 64 and the stator insert 50 is about 1.0 millimeters, and is the maximum allowable distance between the contact surface 84 of the stopper portion 64a and the valve seat 80. The filter 90 ensures that no particles may pass through the filter 90 that are too large to affect the functionality of the solenoid assembly 42 (the particles being too large to fit between the valve seat 80 and the stopper portion 64a) when the armature 64 is in the open position.

The aperture 82 is also in fluid communication with a reservoir cavity, shown generally at 92, formed as part of a reservoir 94. The cavity 92 is also in fluid communication with the check valve 36. The check valve 36 includes a vent port 96, and the vent port 96 includes a cap portion 98 which is connected to a flange portion 100 formed as part of the reservoir 94. The connection between the cap portion 98 and the flange portion 100 may be any suitable connection, such as snap-fitting, welding, an adhesive, or the like. The connection between the cap portion 98 and the flange portion 100 forms a first check valve cavity, shown generally at 102, and formed as part of a lower wall 104 of the reservoir 94 is a plurality of check valve apertures 106, which allow for fluid communication between the cavity 102 and the cavity 92 when the check valve 36 is in an open position.

The check valve 36 also includes a valve member 110, which in this embodiment is an umbrella valve member 110, located in the check valve cavity 102, and includes a flexible flange portion 118 that selectively contacts the lower wall 104. The valve member 110 also includes an inside surface 110a which is part of the flange portion 118, and a base member 110b which is at least partially disposed in a central aperture 104a which is formed as part of the lower wall 104. Formed as part of the base member 110b is a retention feature 110c, which has a larger diameter than the central aperture 104a. The valve member 110 is made of a flexible material, such as rubber, and during assembly, the base member 110b is pressed through the central aperture 104a such that the retention feature 110c is moved into the reservoir cavity 92, as shown in FIG. 3. Because the diameter of the retention feature 110c is larger than the diameter of the central aperture 104a, the base member 110b is prevented from being removed from the central aperture 104a. The central aperture 104a surrounds part of the base member 110b, and part of the lower wall 104 is disposed between the retention feature 110c and a support member 110d, which is also formed as part of the base member 110b, securing the valve member 110 in place relative to the lower wall 104. As mentioned above, the valve member 110 is made of a flexible material, and the flange portion 118 deflects when exposed to air flow in different directions.

An inner wall 112 is part of a base portion 114, and also formed as part of the base portion 114 is a plurality of vents 116 which are in fluid communication with the cavity 102, such that when the flange portion 118 is not in contact with the side wall 104, purge vapor is able to flow from the cavity 92 through the apertures 106 into the cavity 102, and through the vents 116 and into the first vent port 96.

The air flow system 10 has multiple modes of operation. In a first mode of operation, when the turbocharger 14 is not active, air flows through the intake passage 20a, the turbocharger 14, the throttle 16, and into the intake manifold 18. There is vacuum pressure in the intake manifold 18 created by the engine during the first mode of operation, drawing air into the intake manifold 18. This vacuum pressure is also in the seventh conduit 20g, and when the solenoid assembly 42 is in the open position, the vacuum causes the check valve 36 to move towards the closed position, where during the first mode of operation, the vacuum pressure draws the valve member 110 toward the lower wall 104 and away from the inner wall 112, such that the flange portion 118 contacts the inner wall 112, preventing purge vapor from entering the reservoir cavity 92.

There is also vacuum pressure in the fourth conduit 20d, and when the turbo purge valve assembly 22 is in an open position, the vacuum pressure causes the first check valve 24 to open, where during the first mode of operation, the vacuum pressure draws the purge vapor from canister 30, through the sixth conduit 20f, the turbo purge valve assembly 22, and into part of the fifth conduit 20e prior to entering into the fourth conduit 20d. The purge vapor then flows through the fourth conduit 20d, through the third conduit 20c where the purge vapor mixes with air and flows into the intake manifold 18. This same vacuum pressure also causes the second check valve 26 to close, where any purge vapor that may pass through the fifth conduit 20e beyond the area where the fourth conduit 20d connects to the fifth conduit 20e cannot pass through the second check valve 26.

The air flow system also has a second mode of operation, where the turbocharger 14 is activated, and air flowing into the turbocharger 14 from the intake passage 20a becomes pressurized, the pressurized air then flows through the throttle 16, and the air then flows into the intake manifold 18. In this second mode of operation, the manifold 18 is operating under positive pressure. Some of this pressurized air flows into the fourth conduit 20d, and places the first check valve 24 in a closed position.

Additionally, some of the pressurized air also flows into the seventh conduit 20g and into the cavity 108 of the overmold assembly 40 from an inlet port 120 connected to the seventh conduit 20g. The pressurized air then flows through the aperture 82, the cavity 92 of the reservoir 94, through the apertures 106, and into the valve cavity 102. When the third check valve 36 is in the closed position, there is an enclosed area, shown generally at 102a, formed by the shape of the flange portion 118 being in contact with the bottom surface of the lower wall 104. More specifically, an outer edge 118a of the flange portion 118 contacts the bottom surface of the lower wall 104, and the area between the flange portion 118 and the bottom surface of the lower wall 104 forms the enclosed area 102*a*. Once the air flows through the apertures 106, the pressurized air then applies pressure to the inside surface 110*a* of the valve member 110 in the enclosed area 102*a*, causing the flange portion 118 to deflect. The outer edge 118*a* of the flange portion 118 moves away from the lower wall 104, and the check valve 36, and more particularly the valve member 100, is in the open position. Once the air has passed into the valve cavity 102 when the valve member 100 is in the open position, the pressurized air then flows through the vents 116, the vent port 96, and continues through the seventh conduit 20*g*.

The pressurized air passing through the seventh conduit 20*g* also passes through the venturi valve assembly 28, and into the eighth conduit 20*h*. The pressurized air flowing through the venturi valve assembly 28 also creates vacuum pressure in the fifth conduit 20*e*, where air is drawn from the fifth conduit 20*e* into venturi valve assembly 28, such that the air passes through the eighth conduit 20*h* and into the intake passage 20*a*. During the second mode of operation, this vacuum pressure in the fifth conduit 20*e* also places the second check valve 26 in an open position. During the second mode of operation, purge vapor from the canister 30 passes through the sixth conduit 20*f*, the turbo purge valve assembly 22 (when the turbo purge valve assembly 22 is in the open position), and into the fifth conduit 20*e*. The purge vapor flows into the venturi valve assembly 28 and mixes with the pressurized air in the eighth conduit 20*h*, and flows into the air box 12. The purge vapor and air mixture then flows through the turbocharger 14, the throttle 16, and into the intake manifold 18.

During the second mode of operation, the venturi valve assembly 24 also creates a back pressure in the area of the seventh conduit 20*g* between the venturi valve assembly 24 and the bypass switching valve assembly 34. The valve member 110 is exposed to this back pressure as well. More particularly, the back pressure in the check valve cavity 102 and the pressurized air flowing into the check valve cavity 102 from the reservoir cavity 92 provides a pressure differential around the flange portion 118 of the valve member 110. This ensures that regardless of what the pressure level is of the pressurized air generated by the turbocharger 14, the valve member 110 is exposed to a differential pressure, and not the actual pressure of the pressurized air from the turbocharger 14.

The configuration of the bypass check valve 36 ensures that if there is a leak in the fifth conduit 20*e*, the eighth conduit 20*e*, a malfunction of the venturi valve assembly 28, or some other failure, the check valve 36 remains closed, preventing any undesired air from entering the second conduit 20*b*, and all of the air entering in the intake manifold 18 during the first mode of operation is detected and measured by the mass airflow sensor 12.

Although it has been shown that the third check valve 36 is integrated with the valve assembly 34, it is within the scope of the invention that the third check valve 36 may be a separate component from the valve assembly 34, and may be placed at a different location either upstream or downstream from the valve assembly 34, and still perform the required functions for the system 10 to operate as previously described.

Figure 4:
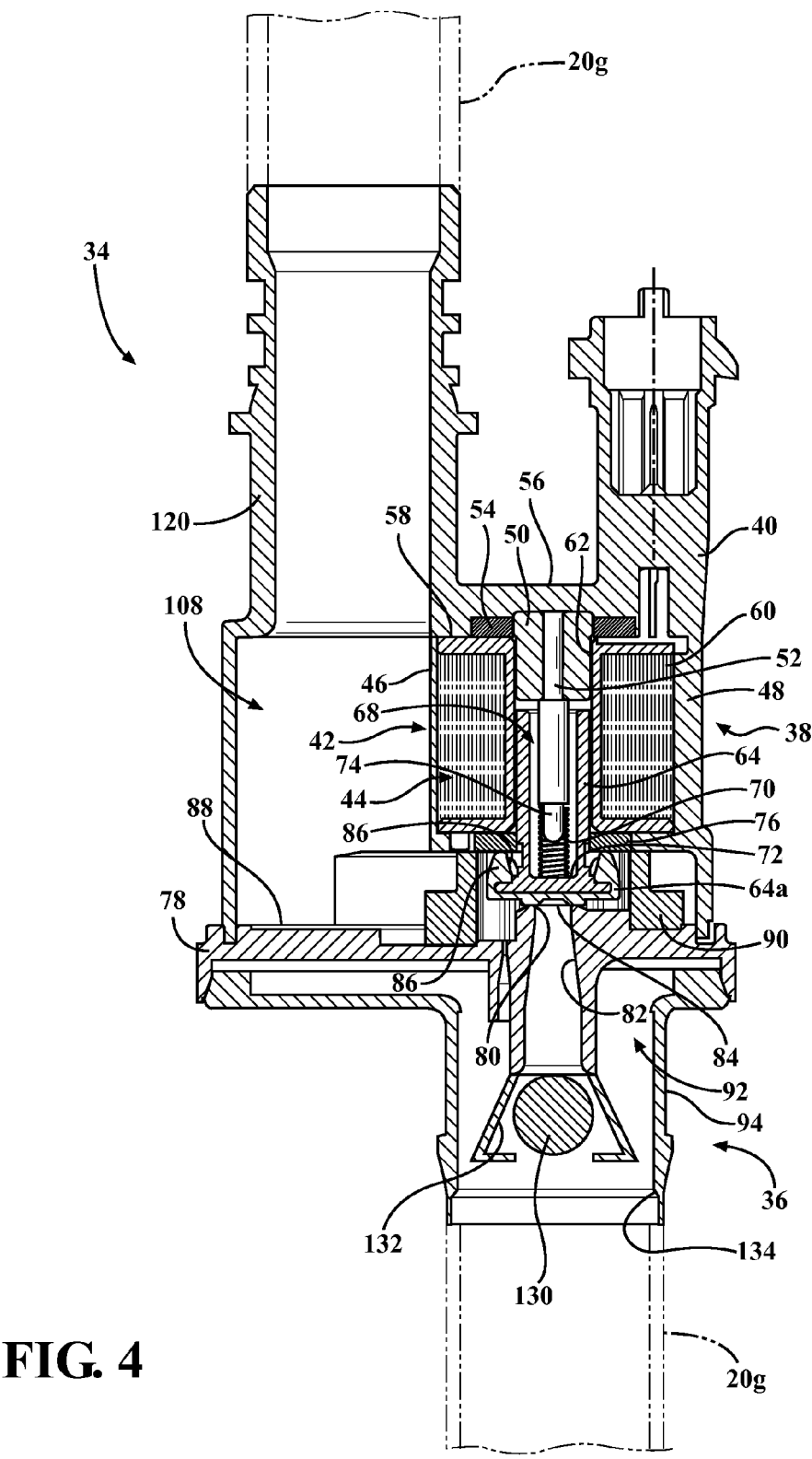
FIG. 4 is a sectional side view of an alternate embodiment of an integrated valve assembly, according to embodiments of the present invention.

In the embodiments described above, the third check valve 36 is an umbrella valve. However, it is within the scope of the invention that the third check valve 36 may be other types of valves, such as a ball valve having a check ball 130 that is selectively disposed on a valve seat 132, shown in FIG. 4. Instead of having the vent port 96 with the plurality of vents 116, the valve assembly 34 has an outlet 134 connected to an in fluid communication with the seventh conduit 20*g*. In other alternate embodiments, various check valve designs could be integrated into the valve assembly 34, such as a flap, a duckbill, or the like, and all would be suitable. The check valve 36 could also be incorporated into the inlet port 120 of the valve assembly 34, and the valve assembly 34 would still perform as desired.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    a valve assembly, including:
        an inlet port in fluid communication with a turbocharger, and the inlet port in fluid communication with an intake manifold of an engine;
        a first cavity in fluid communication with the inlet port;
        a second cavity;
        a cavity adjacent the first cavity;
        an inner wall portion located between and separating the cavity and the first cavity;
        an outer wall portion being substantially parallel to the inner wall portion, the cavity located between the outer wall portion and the inner wall portion;
        a first valve at least partially located in the cavity adjacent the first cavity, the first valve controlling flow between the first cavity and the second cavity;
        a second valve in fluid communication with the second cavity;
        a first mode of operation, and during the first mode of operation, the valve assembly is exposed to vacuum pressure in the first cavity such that when the first valve is open, the second cavity and the second valve are exposed to the vacuum pressure such that the second valve is placed in a closed position; and
        a second mode of operation, during the second mode of operation and when the first valve is open, pressurized air flows through the first cavity, the first valve, the second cavity, and applies pressure to the second valve to open the second valve.

2. The apparatus of claim 1, the second valve further comprising bypass check valve.

3. The apparatus of claim 2, the bypass check valve further comprising:
    a valve member;
    a check valve cavity in fluid communication with the second cavity, the valve member disposed in the check valve cavity, the second cavity separated from the check valve cavity by a lower wall;
    a flexible flange portion formed as part of the valve member; and
    an outer edge formed as part of the flexible flange portion, the outer edge selectively in contact with a bottom surface of the lower wall;
    wherein during the first mode of operation, the outer edge is in contact with the bottom surface of the lower wall, and the bypass check valve is closed, and during the second mode of operation, the pressurized air applies pressure to an inside surface of the flexible flange portion, moving the outer edge of the flexible flange portion away from the lower wall, allowing the pressurized air to flow around the flexible flange portion and out of the bypass check valve.

4. The apparatus of claim 3, the bypass check valve further comprising:
an enclosed area formed between the inside surface of the flexible flange portion and the lower wall when the outer edge formed as part of the flexible flange portion is in contact with the lower wall;
wherein during the second mode of operation, the pressurized air flows into the enclosed area until enough pressure is applied to the flexible flange portion to move the outer edge way from the lower wall.

5. The apparatus of claim 3, the bypass check valve further comprising:
a base member disposed in a central aperture formed as part of the lower wall;
a retention feature connected to the base member, the retention feature maintaining the position of the base member in the central aperture;
a support member connected to the base member; and
wherein the lower wall is disposed between the support member and the retention feature when the base member is disposed in the central aperture.

6. The apparatus of claim 3, the valve assembly further comprising:
an overmold assembly, the first cavity formed as part of the overmold assembly, and the first valve being disposed in the overmold assembly;
a cap connected to the overmold assembly;
a reservoir connected to the cap, the lower wall and the second cavity being part of the reservoir;
at least one check valve aperture formed as part of the lower wall, the at least one check valve aperture providing fluid communication between the second cavity and the check valve cavity; and
wherein during the first mode of operation, at least a portion of the check valve cavity is exposed to the vacuum pressure, placing the outer edge formed as part of the flexible flange portion in contact with a bottom surface of the lower wall, and during the second mode of operation, the pressurized air in the second cavity flows through the at least one check valve aperture into the check valve cavity, applying pressure to the inside surface of the flexible flange portion, moving the outer edge of the flexible flange portion away from the lower wall.

7. The apparatus of claim 6, the first cavity further comprising an overmold assembly cavity.

8. The apparatus of claim 7, the second cavity further comprising a reservoir cavity.

9. The apparatus of claim 8, further comprising a cap aperture formed as part of the cap, the cap aperture providing fluid communication between the overmold assembly cavity and the reservoir cavity.

10. The apparatus of claim 3, wherein the valve assembly is part of an air flow system further comprising:
a turbocharger unit in fluid communication with the valve assembly; and
a venturi valve member in fluid communication with the valve assembly;
wherein during the first mode of operation, the turbocharger unit is deactivated, and the valve assembly is exposed to vacuum pressure from the intake manifold such that when the first valve is open, the flexible flange portion is exposed to the vacuum pressure such that the second valve is placed in a closed position, and during a second mode of operation the turbocharger unit is activated, and when the first valve is open, pressurized air flows through the first valve, and moves the outer edge of the flexible flange portion away from the lower wall, and the venturi valve member generates a pressure differential around the flexible flange portion.

11. The apparatus of claim 10, further comprising a back pressure created by the venturi valve assembly during the second mode of operation, wherein the flexible flange portion is exposed to at least a portion of the pressurized air from the turbocharger unit and the back pressure created by the venturi valve assembly during the second mode of operation, creating a pressure differential around the flexible flange portion, such that the magnitude of movement of the flexible flange portion away from the lower wall is in proportion to the magnitude of the pressure differential.

12. A valve assembly, comprising:
an inlet port in fluid communication with a turbocharger, and the inlet port in fluid communication with an intake manifold of an engine;
an overmold assembly;
an overmold assembly cavity formed as part of the overmold assembly, the overmold assembly cavity in fluid communication with the inlet port;
a cavity adjacent the overmold assembly cavity;
an inner wall portion formed as part of the overmold assembly, the inner wall portion located between and separating the cavity and the overmold assembly cavity;
an outer wall portion formed as part of the overmold assembly the outer wall portion being substantially parallel to the inner wall portion, the cavity located between the outer wall portion and the inner wall portion;
a cap connected to the overmold assembly;
a reservoir connected to the cap;
a reservoir cavity formed as part of the reservoir;
a bypass switching valve at least partially located in the cavity adjacent the first cavity, the bypass switching valve controlling flow between the overmold assembly cavity and the reservoir cavity, the bypass switching valve located in the overmold assembly;
a lower wall formed as part of the reservoir;
a check valve cavity;
a bypass check valve mounted to the lower wall and located in the check valve cavity; and
at least one check valve aperture providing fluid communication between the reservoir cavity and the check valve cavity;
a first mode of operation, during the first mode of operation, the valve assembly is exposed to vacuum pressure in the overmold assembly cavity such that when the bypass switching valve is open, the reservoir cavity, the at least one check valve aperture, and the bypass check valve are exposed to the vacuum pressure such that the bypass check valve is placed in a closed position; and
a second mode of operation, during the second mode of operation and when the bypass switching valve is open, pressurized air flows through the overmold assembly cavity, the bypass switching valve, the reservoir cavity, the at least one check valve aperture, and applies pressure to the bypass check valve to open the bypass check valve.

13. The valve assembly of claim 12, further comprising a cap aperture formed as part of the cap, the cap aperture providing fluid communication between the overmold assembly cavity and the reservoir cavity when the bypass switching valve is in the closed position.

14. The valve assembly of claim 12, the bypass check valve further comprising:

a valve member disposed in the check valve cavity;
a flexible flange portion formed as part of the valve member;
an outer edge formed as part of the flexible flange portion, the outer edge selectively in contact with the bottom surface of the lower wall; and
an enclosed area formed between the inside surface of the flexible flange portion and the lower wall when the outer edge formed as part of the flexible flange portion is in contact with the lower wall;
wherein during the second mode of operation, the pressurized air flows through the at least one check valve aperture and into the enclosed area until enough pressure is applied to the flexible flange portion to move the outer edge way from the lower wall.

15. The apparatus of claim 14, the bypass check valve further comprising:
a base member disposed in a central aperture formed as part of the lower wall;
a retention feature connected to the base member and disposed in the reservoir cavity, the retention feature maintaining the position of the base member in the central aperture;
a support member connected to the base member, the support member located in the check valve cavity; and
wherein the lower wall is disposed between the support member and the retention feature when the base member is disposed in the central aperture.

16. The apparatus of claim 14, wherein the valve assembly is part of an air flow system further comprising:
a turbocharger unit in fluid communication with the overmold assembly cavity, such that at least a portion of pressurized air generated by the turbocharger unit flows into the overmold assembly cavity; and
a venturi valve member in fluid communication with the valve assembly, such that when exposed to the pressurized air from the turbocharger unit, the venturi valve assembly creates a back pressure such that the bypass check valve is exposed to the back pressure;
wherein during the first mode of operation, the turbocharger unit is deactivated, and the valve assembly is exposed to vacuum pressure from the intake manifold such that when the bypass switching valve is open, the valve member is exposed to the vacuum pressure such that the valve member is placed in a closed position, and during the second mode of operation the turbocharger unit is activated, and when the bypass switching valve is open, pressurized air flows through the bypass switching valve, and places the valve member valve in an open position, and the back pressure and pressurized air create a pressure differential around the valve member.

17. A valve assembly for an air flow system, comprising:
a turbocharger unit for selectively generating pressurized air when activated, and directing at least a portion of the pressurized air to an intake manifold;
a venturi valve member for receiving a portion of the pressurized air from the turbocharger unit, and generating back pressure;
a bypass switching valve in fluid communication with the turbocharger and the venturi valve member, the bypass switching valve being part of the valve assembly;
an inlet port in fluid communication with the turbocharger unit, and the inlet port in fluid communication with the intake manifold;
an overmold assembly;
an overmold assembly cavity formed as part of the overmold assembly, the overmold assembly cavity in fluid communication with the inlet port;
a cavity adjacent the overmold assembly cavity, the bypass switching valve located in the cavity;
an inner wall portion formed as part of the overmold assembly, the inner wall portion located between and separating the cavity and the overmold assembly cavity;
an outer wall portion formed as part of the overmold assembly the outer wall portion being substantially parallel to the inner wall portion, the cavity located between the outer wall portion and the inner wall portion;
a cap connected to the overmold assembly;
a reservoir connected to the cap;
a reservoir cavity formed as part of the reservoir, the bypass switching valve controlling flow between the overmold assembly cavity and the reservoir cavity;
a bypass check valve being part of the valve assembly and in fluid communication with the bypass switching valve;
a first mode of operation, during the first mode of operation, the turbocharger unit is deactivated, and the valve assembly is exposed to vacuum pressure from the intake manifold such that when the bypass switching valve is open, the bypass check valve is exposed to the vacuum pressure such that the bypass check valve is placed in a closed position; and
a second mode of operation, during the second mode of operation the turbocharger unit is activated, and when the bypass switching valve is open, pressurized air flows through the bypass switching valve, and places the bypass check valve in an open position, and the venturi valve member generates a pressure balance in the bypass check valve.

18. The valve assembly for an air flow system of claim 17, further comprising:
a solenoid assembly disposed in the overmold assembly, the solenoid assembly being part of the bypass switching valve;
a lower wall forming as part of the reservoir cavity, the lower wall being part of the reservoir;
at least one check valve aperture formed as part of the lower wall, the at least one check valve aperture providing fluid communication between the reservoir cavity and the bypass check valve; and
a cap aperture formed as part of the cap, the cap aperture providing fluid communication between the overmold assembly cavity and the reservoir cavity;
wherein the solenoid assembly opens the bypass switching valve, and during the first mode of operation, the overmold assembly cavity is exposed to the vacuum pressure, and therefore the cap aperture, the reservoir cavity, and the at least one check valve aperture are also exposed to the vacuum pressure, closing the bypass check valve, and in the second mode of operation, the pressurized air flows through the overmold assembly cavity, the cap aperture, and into the reservoir cavity, and trough the at least one check valve aperture, applying pressure to the bypass check valve, opening the bypass check valve.

19. The valve assembly for an air flow system of claim 18, the bypass check valve further comprising:
a check valve cavity;
a valve member disposed in the check valve cavity;

a flexible flange portion formed as part of the valve member;

an outer edge formed as part of the flexible flange portion, the outer edge selectively in contact with the bottom surface of the lower wall; and an enclosed area formed between the inside surface of the flexible flange portion and the lower wall when the outer edge formed as part of the flexible flange portion is in contact with the lower wall;

wherein during the second mode of operation, the pressurized air flows through the at least one check valve aperture and into the enclosed area until enough pressure is applied to the flexible flange portion to move the outer edge away from the lower wall.

20. The valve assembly for an air flow system of claim 19, the bypass check valve further comprising:

a base member disposed in a central aperture formed as part of the lower wall;

a support member connected to the base member and the flexible flange portion; and a retention feature connected to the base member;

wherein the lower wall is disposed between the support member and the retention feature when the base member is disposed in the central aperture.

21. The valve assembly of claim 19, wherein the flexible flange portion is exposed to at least a portion of the pressurized air from the turbocharger unit and the back pressure created by the venturi valve assembly, creating a pressure differential around the flexible flange portion, such that the magnitude of movement of the flexible flange portion away from the lower wall is in proportion to the magnitude of the pressure differential.

* * * * *